(12) United States Patent  
Powell

(10) Patent No.: US 9,335,135 B2
(45) Date of Patent: *May 10, 2016

(54) REAR-DEPLOYING MECHANICAL BROADHEAD

(71) Applicant: Keith Powell, Rockwall, TX (US)

(72) Inventor: Keith Powell, Rockwall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/542,243

(22) Filed: Nov. 14, 2014

(65) Prior Publication Data

US 2015/0105192 A1    Apr. 16, 2015

Related U.S. Application Data

(63) Continuation of application No. 13/943,379, filed on Jul. 16, 2013, now Pat. No. 8,915,808.

(60) Provisional application No. 61/682,831, filed on Aug. 14, 2012.

(51) Int. Cl.
*F42B 6/08* (2006.01)
*F42B 12/34* (2006.01)

(52) U.S. Cl.
CPC .. *F42B 12/34* (2013.01); *F42B 6/08* (2013.01)

(58) Field of Classification Search
CPC ....................................................... F42B 6/08
See application file for complete search history.

(56) References Cited

U.S. PATENT DOCUMENTS

| 3,138,383 | A | 6/1964 | McKinzie |
| 6,669,586 | B2 | 12/2003 | Barrie et al. |
| 6,910,979 | B2 | 6/2005 | Barrie et al. |
| 7,905,802 | B2 | 3/2011 | Erhard |
| 8,016,704 | B1 | 9/2011 | Vandewater |
| 8,105,187 | B1 | 1/2012 | Sanford |
| 8,197,367 | B2 | 6/2012 | Pulkrabek |
| 8,393,983 | B1 | 3/2013 | Sanford |
| 8,545,349 | B1 | 10/2013 | Budris et al. |
| 8,911,311 | B1 | 12/2014 | Mizek et al. |
| 8,915,808 | B2 * | 12/2014 | Powell .................... F42B 12/34 473/583 |
| 2009/0203477 | A1 | 8/2009 | Mizek et al. |
| 2012/0165142 | A1 | 6/2012 | Grace |

* cited by examiner

*Primary Examiner* — John Ricci
(74) *Attorney, Agent, or Firm* — Klemchuk LLP; Kirby B. Drake

(57) ABSTRACT

Rear-deploying mechanical broadheads may be provided having stationary blades that open only through movement of a drive pin/key secured within a slot or chamber in the body of the broadhead. The drive pin/key may act as bleeder blades, thereby forming a mechanical broadhead with bleeder blades. The stationary blades may be pinned to the tip of the broadhead through blade pins, thereby keeping the blades stationary during flight toward a target and lessening the likelihood that the broadhead may be errant in its movement toward a target.

19 Claims, 10 Drawing Sheets

REAR-DEPLOYING MECHANICAL BROADHEAD

CROSS-REFERENCE TO RELATED APPLICATION

This application is a continuation of U.S. patent application Ser. No. 13/943,379, entitled REAR-DEPLOYING MECHANICAL BROADHEAD, filed on Jul. 16, 2013, which claims priority to U.S. Provisional Patent Application No. 61/682,831, entitled REAR-DEPLOYING MECHANICAL BROADHEAD, filed on Aug. 14, 2012, all of which are incorporated by reference in their entirety.

FIELD OF THE DISCLOSURE

The present disclosure generally relates to broadheads, and more particularly to rear-deploying mechanical broadheads.

BACKGROUND

Broadheads are arrowheads that have a minimum of two sharp blades that may cause severe damage to their target. Broadheads are designed for hunting purposes. Initially, all broadheads were fixed blade broadheads. Fixed blade broadheads started losing their popularity as bow manufacturers started producing state of the art bows with arrow speeds exceeding 200 feet per second (FPS). Errors or deviations in arrow accuracy began occurring as a result of the excessive arrow speeds because of the size of the broadhead. Smaller, mechanical broadheads were introduced to combat the errors or deviations of the inconsistent flight that had been occurring with fixed blade broadheads. Mechanical broadheads have a smaller in-flight diameter but a larger cutting diameter than fixed blade broadheads; however, some mechanical broadheads experience some of the same errors or deviations in shooting inconsistency when the blades are loose and sometimes may open prematurely in flight.

SUMMARY

Embodiments of the present disclosure may provide a rear-deploying mechanical broadhead that may have stationary blades that open only through movement of a drive pin/key secured within a slot or chamber in the body of the broadhead. The drive pin/key may act as bleeder blades, thereby forming a mechanical broadhead with bleeder blades. The stationary blades may be pinned to the tip of the broadhead through blade pins, thereby keeping the blades and the tip secure during all operations of the broadhead according to embodiments of the present disclosure and lessening the likelihood that the broadhead may be errant in its movement toward a target. Further, a mechanical broadhead formed according to embodiments of the present disclosure may fly like a field point but strike like a fixed blade.

Embodiments of the present disclosure may provide a rear-deploying mechanical broadhead with a body having a first end and a second end with a slot disposed toward the second end, a drive key secured within the slot in the body, and stationary blades pinned to a tip that open only through movement of the drive key secured within the slot in the body, wherein the drive key may open the stationary blades when the drive key moves within the slot from a first position closest to the tip and reaches the second position away from the tip. The stationary blades may be disposed substantially diametrically opposite each other along the longitudinal axis of the body. The stationary blades may be pinned to the tip with blade pins secured in slots on opposing sides of the body. The stationary blades may include cutting edges wherein the cutting width of the stationary blades is smaller near the tip and gradually increases toward the rear along a leading edge of the stationary blades. The broadhead may comprise at least one notch on each of the stationary blades that receives a portion of an o-ring. The tip may remain stationary as the drive key reaches the second position and the stationary blades open. The drive key may act as bleeder blades.

Embodiments of the present disclosure may provide a rear-deploying mechanical broadhead with blades disposed diametrically opposite each other along a longitudinal axis of a body, and a slot disposed within the body, the slot having a first position and a second position, the first position disposed closer in proximity to a tip than the second position, the slot slidably receiving a drive key, wherein the blades are closed when the drive key is disposed in the first position and the blades open when the drive key is moved into the second position of the slot. There may be an opening within the body that receives a pin that couples the body to the tip. The broadhead also may include blade pins that couple the blades to the tip. The broadhead may further include at least one notch on each of the blades that receives at least a portion of an o-ring. The tip may remain stationary when the drive key is moved into the second position and the blades open. The blades may be stationary until the drive key is moved into the second position.

Embodiments of the present disclosure may provide a rear-deploying mechanical broadhead with a tip coupled to a body, stationary blades pinned to the tip, a slot disposed within the body, the slot having a first position and a second position, wherein the first position is located closer in proximity to the tip than the second position, and a drive key disposed within the slot, wherein the stationary blades open only when the drive key moves to the second position. The tip may be coupled to the body with a pin. The stationary blades may be pinned to the tip with blade pins. The stationary blades may be disposed substantially diametrically opposite each other along the longitudinal axis of the body. The stationary blades may include cutting edges wherein the cutting width of the stationary blades is smaller near the tip and gradually increases toward the rear along a leading edge of each of the stationary blades. The broadhead may also include at least one notch on each of the stationary blades that receives at least a portion of an o-ring. The tip may remain stationary when the drive key moves to the second position.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
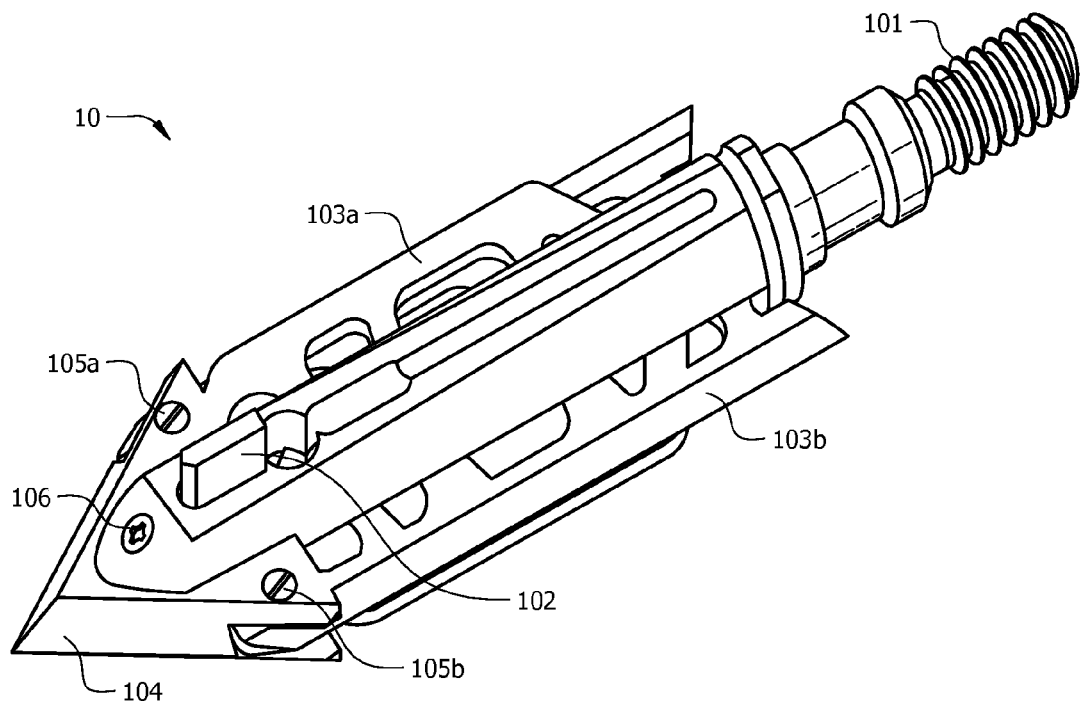
FIG. 1 depicts a view of a rear-deploying mechanical broadhead in a closed position according to an embodiment of the present disclosure.
Figure 2:
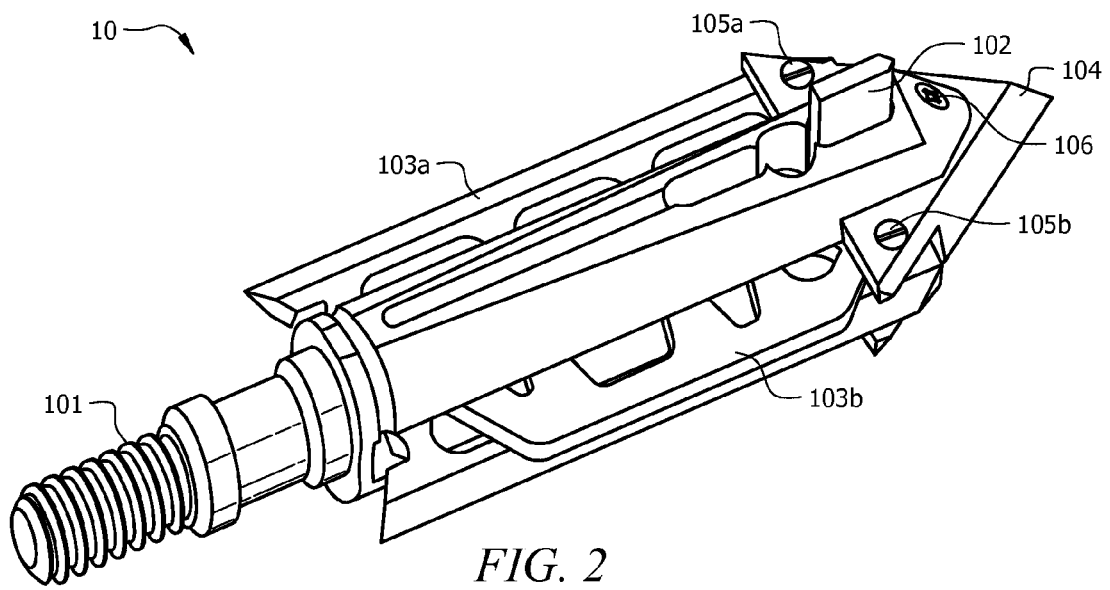
FIG. 2 depicts a view of a rear-deploying mechanical broadhead in a closed position according to an embodiment of the present disclosure.
Figure 3:
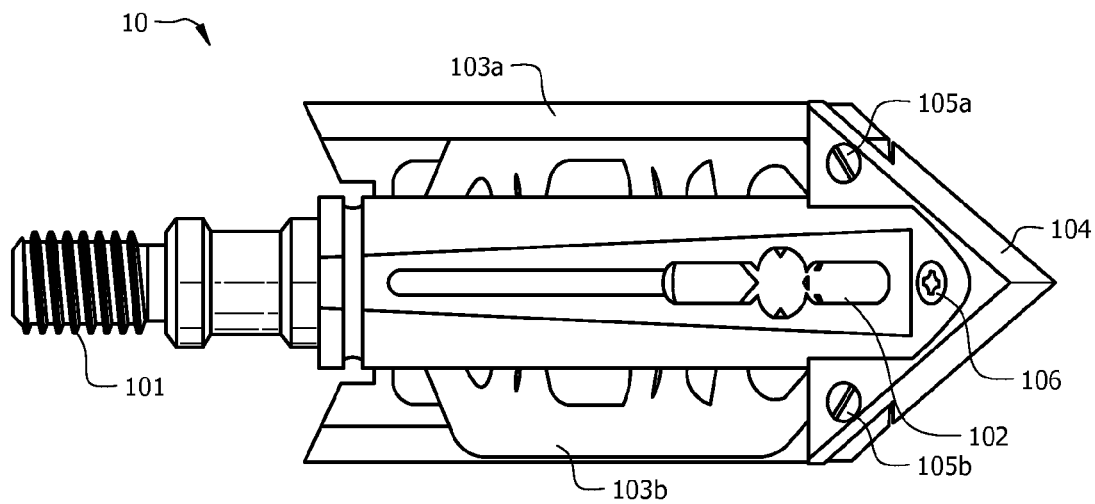
FIG. 3 depicts a view of a rear-deploying mechanical broadhead in a closed position according to an embodiment of the present disclosure.
Figure 4:
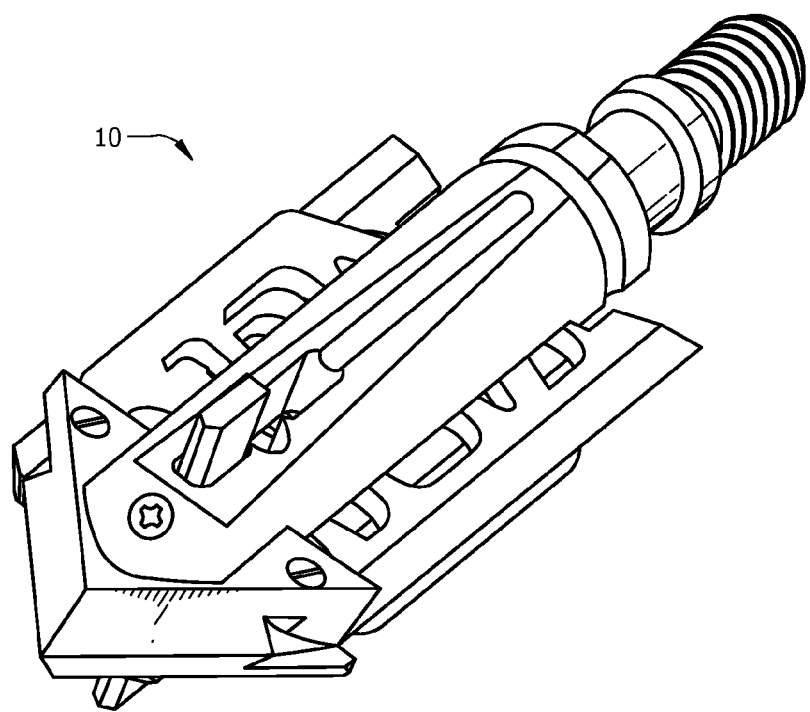
FIG. 4 depicts a view of a rear-deploying mechanical broadhead in a closed position according to an embodiment of the present disclosure.

Embodiments of the present disclosure may provide a rear-deploying mechanical broadhead including a drive pin/key set through the body of the broadhead. This drive pin/key may drive the blades open when it moves from a first position closest to the tip of the broadhead to a second position away from the tip of the broadhead according to embodiments of the present disclosure. When the drive pin/key moves back to the second position, the drive pin/key opens the broadhead blades ahead of the blades actually touching the target, and the blades may push outwardly from the rear of the body of the broadhead and butterfly or scissor. Because the drive pin/key holds the blades stationary until contact is made with the drive pin/key, the blades of the broadhead may remain stationary (i.e., are not loose and/or flopping around) during flight toward a target, thereby lessening the likelihood that the broadhead may be errant in its movement toward a target. The tip may be a solid cut on contact tip that does not move in all operations of the broadhead. Accordingly, the cutting achieved by the broadhead may be maximized (i.e., a wider cutting diameter) while also ensuring that the blades and tip of the broadhead may remain secure in flight toward its target. Further, a mechanical broadhead formed according to embodiments of the present disclosure may fly like a field point but strike like a fixed blade.

FIGS. 1-4 depict various views of rear-deploying mechanical broadhead 10 in a closed position according to embodiments of the present disclosure. Broadhead 10 may include body 101 with a first end and a second end having an opening/slot at the second end for receiving tip/body pin 106 that may couple body 101 to tip 104. Tip 104 may include a pointed end that may facilitate penetration of tip 104 into a target.

Blades 103a, 103b may be disposed substantially diametrically opposite each other about the longitudinal axis of body 101. Blades 103a, 103b may be coupled to tip 104 and attached with blade pins 105a, 105b secured in slots on opposite sides of body 101. Blades 103a, 103b may receive blade pins 105a, 105b at the forward portions of blades 103a, 103b nearer to tip 104 and the second end of body 101. As blades 103a, 103b are connected to tip 104 through blade pins 105a, 105b respectively, blades 103a, 103b may remain stationary while in flight toward a target. Blades 103a, 103b may include cutting edges. The cutting width of blades 103a, 103b may be smaller near tip 104 and may gradually increase toward the rear along a leading edge of the blade. While two blades 103a, 103b have been depicted in FIGS. 1-4, it should be appreciated that more or fewer blades may be included as part of broadhead 10 without departing from the present disclosure.

Body 101 also may be sized to include a chamber or slot toward the second end of body 101 for receiving drive pin/key 102. The chamber or slot may include a first position close to tip 104 and a second position away from tip 104. In FIGS. 1-4, drive pin/key 102 is depicted in a first position. It should be appreciated that blades 103a, 103b may be fixed and only open out through movement of drive pin/key 102 from the first position to the second position. Blades 103, 103b may remain closed while drive pin/key 102 is in the first position close to tip 104 within the slot or chamber in body 101. As such, blades 103a, 103b do not rock and are not loose when broadhead 10 is flying through the air toward a target because the blades are held stationary until contact is made with the drive pin/key. The first end of body 101 may be threaded in some embodiments of the present disclosure; however, it should be appreciated that the first end of body 101 may assume other shapes without departing from the present disclosure. It also should be appreciated that body 101 may be formed from different materials, including but not limited to steel, titanium, composite, plastic, and lightweight aluminum alloy, according to embodiments of the present disclosure.

Figure 5:
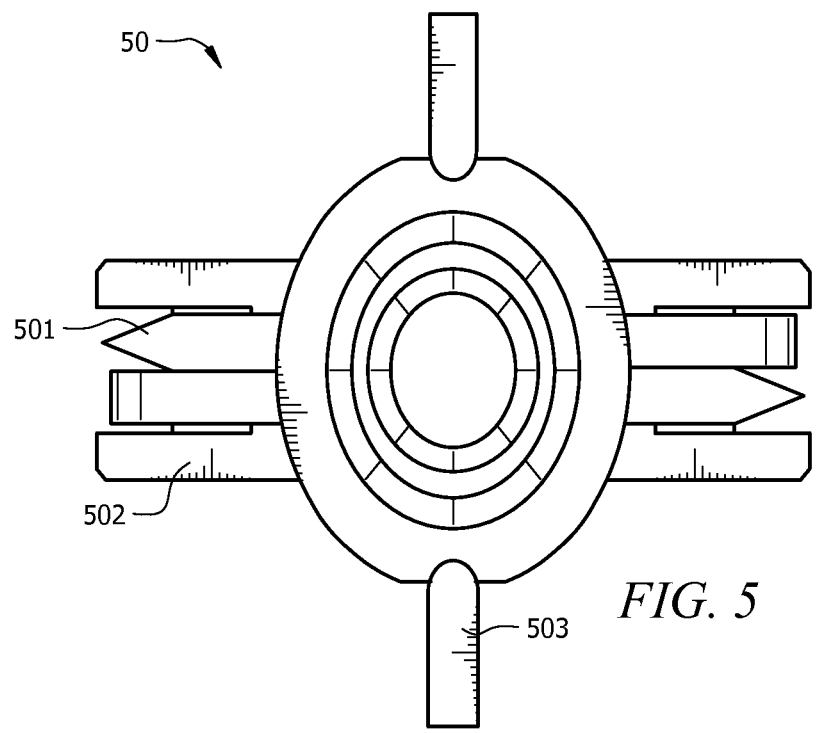
FIG. 5 depicts a perspective view of a rear-deploying mechanical broadhead in a closed position from a view behind the drive pin/key according to an embodiment of the present disclosure.
Figure 6:
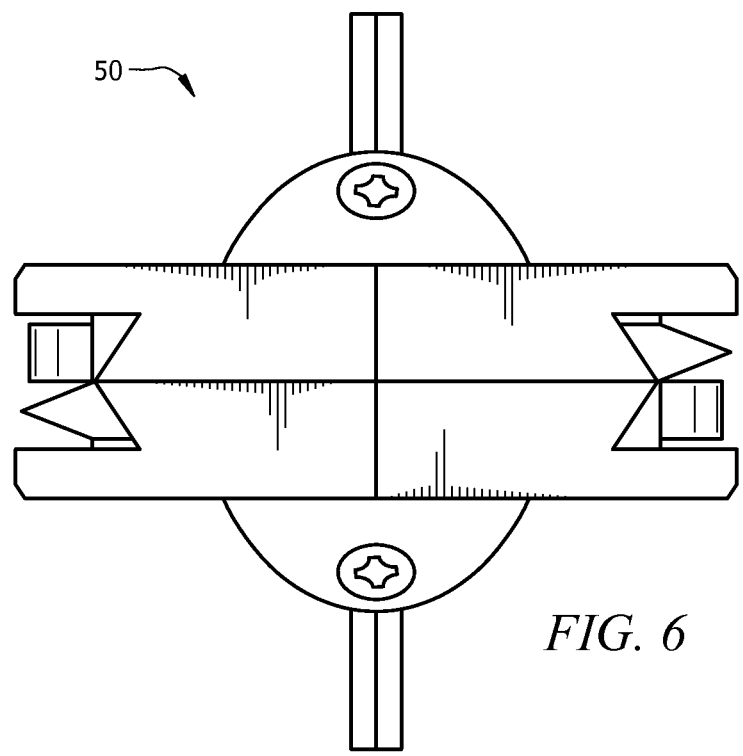
FIG. 6 depicts a perspective view of a rear-deploying mechanical broadhead in a closed position from a view in front of the drive pin/key according to an embodiment of the present disclosure.
Figure 7:
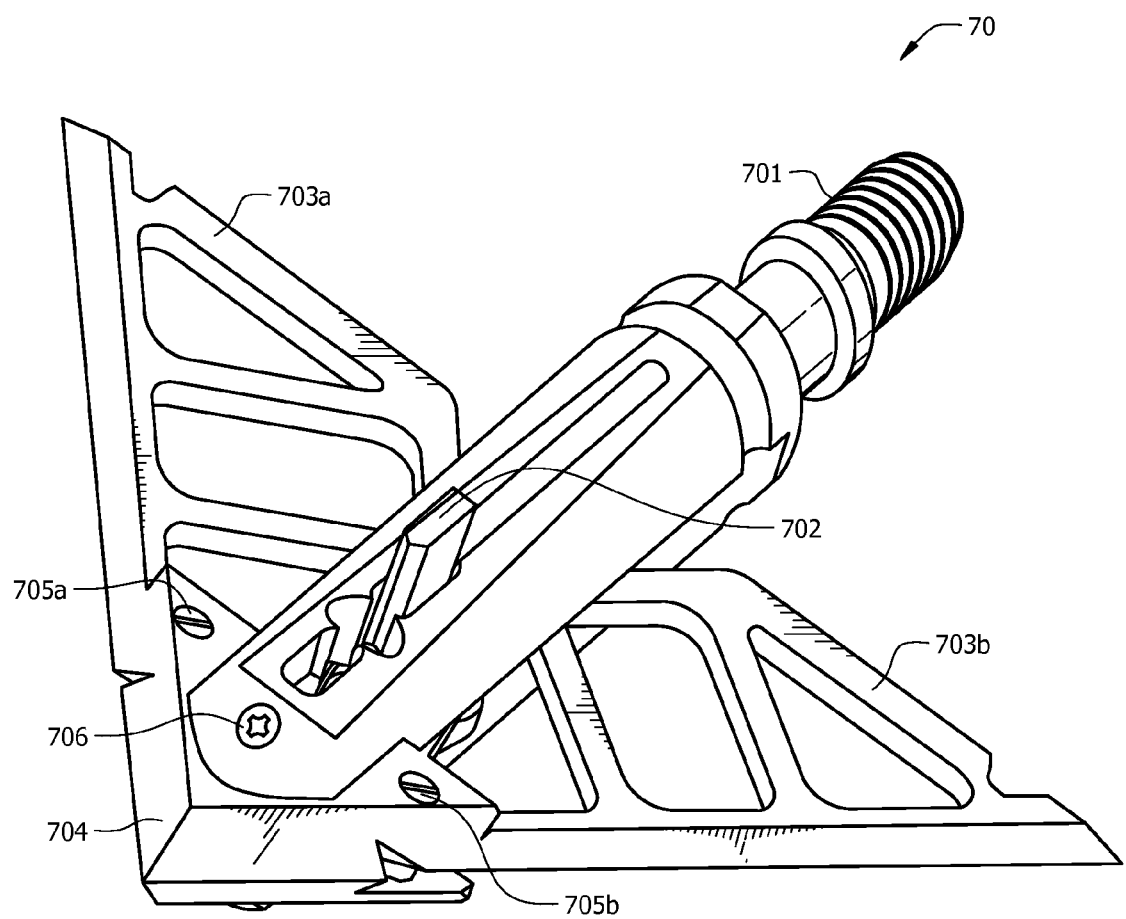
FIG. 7 depicts a view of a rear-deploying mechanical broadhead in an open position according to an embodiment of the present disclosure.
Figure 8:
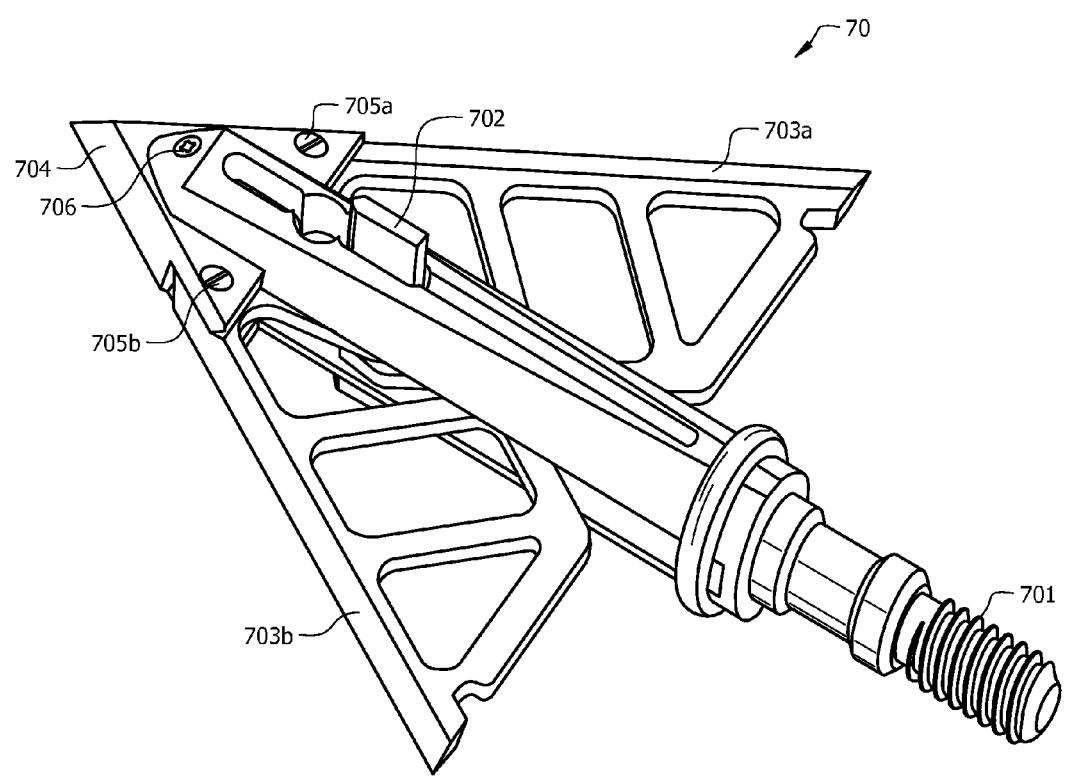
FIG. 8 depicts a view of a rear-deploying mechanical broadhead in an open position according to an embodiment of the present disclosure.
Figure 9:
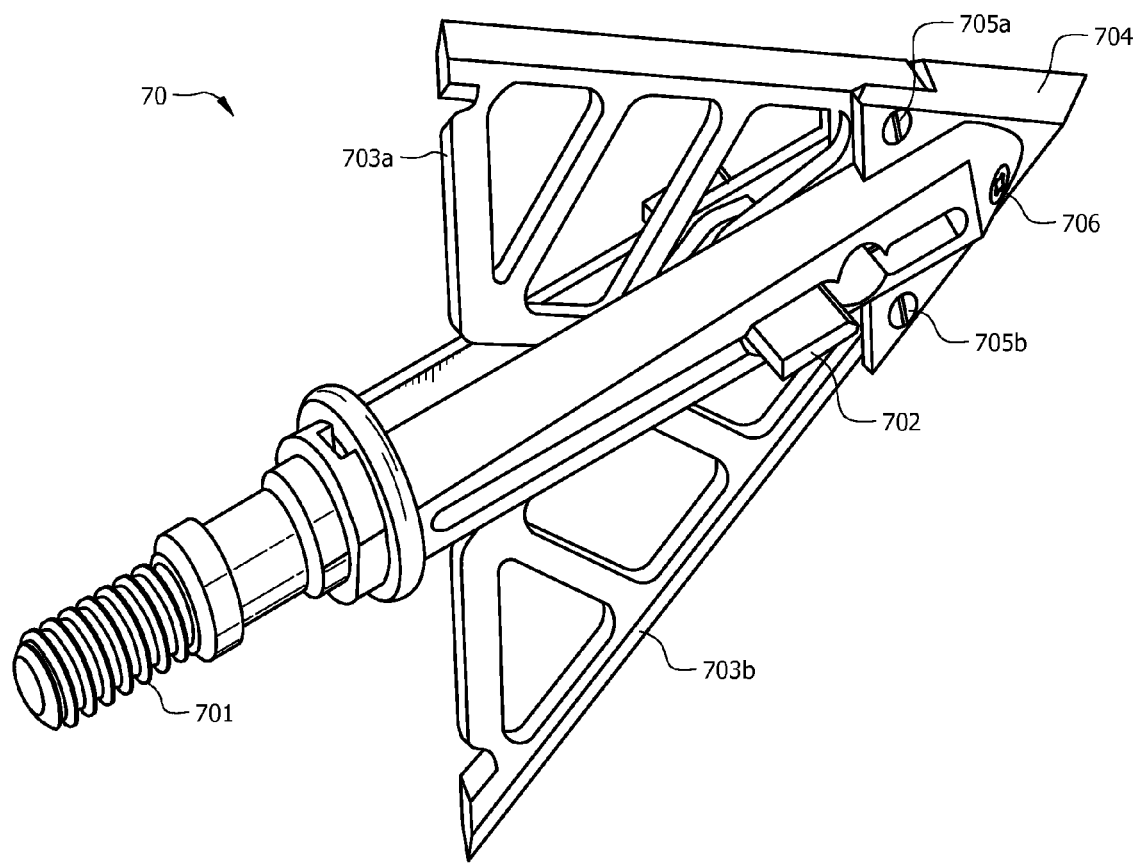
FIG. 9 depicts a view of a rear-deploying mechanical broadhead in an open position according to an embodiment of the present disclosure.
Figure 10:
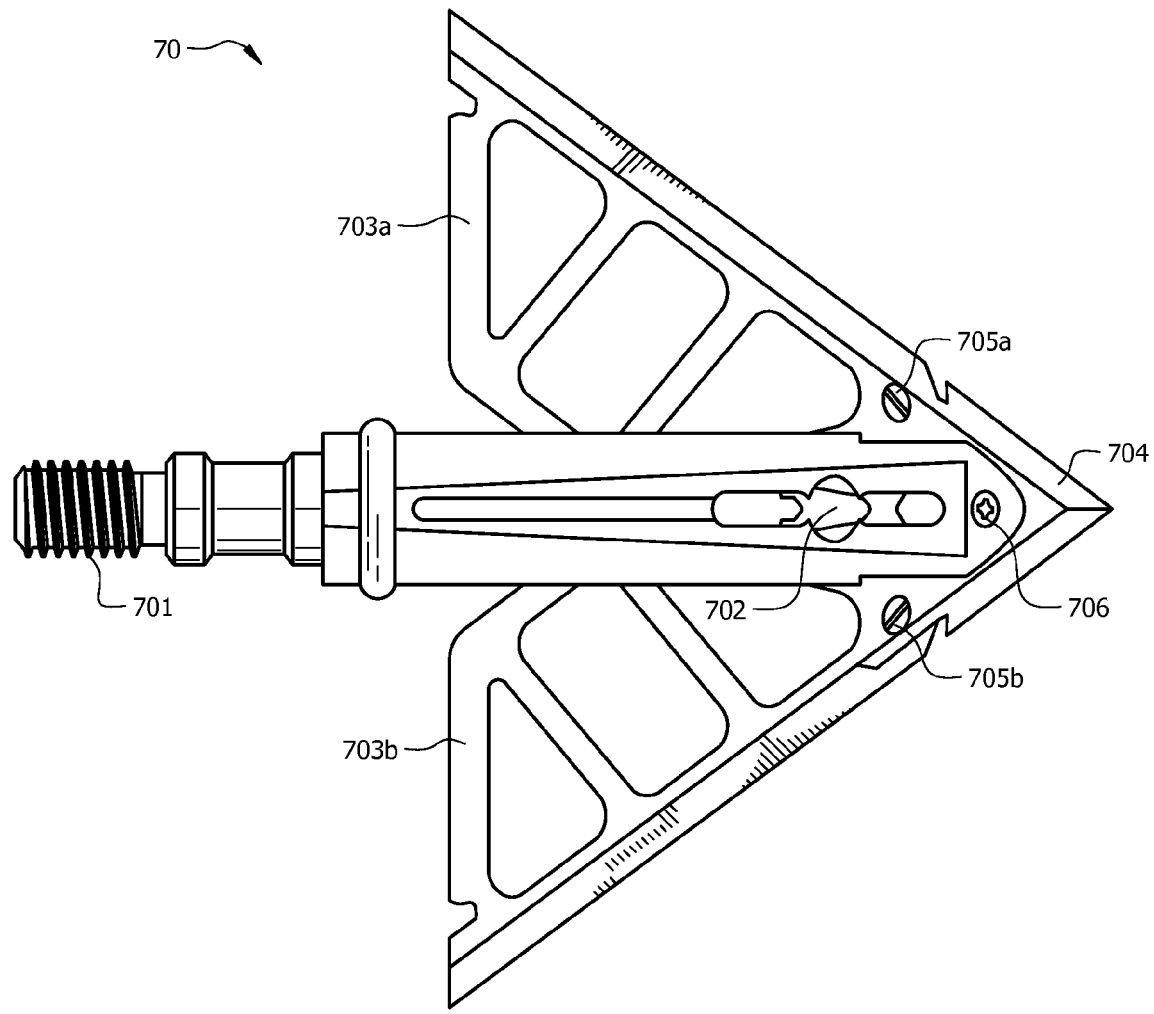
FIG. 10 depicts a view of a rear-deploying mechanical broadhead in an open position according to an embodiment of the present disclosure.
Figure 11:
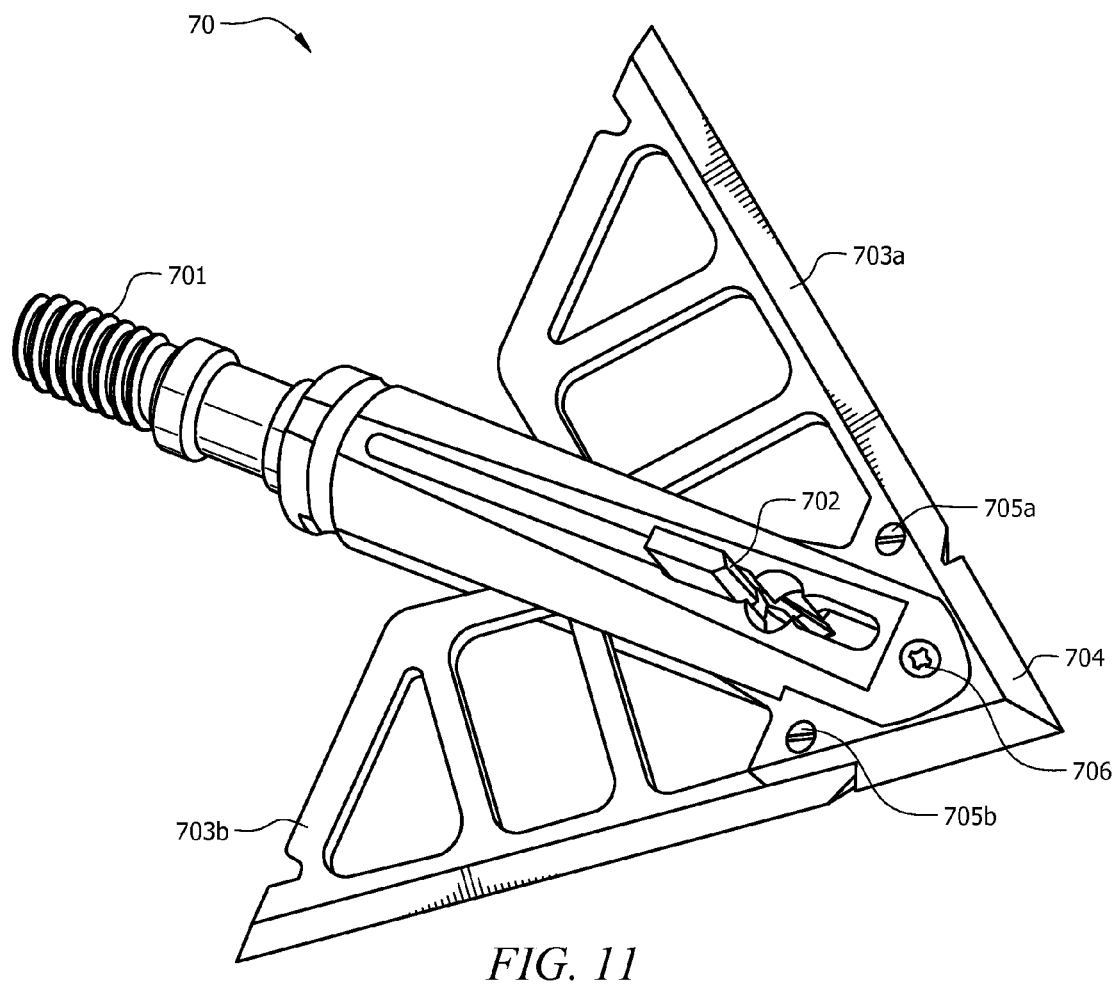
FIG. 11 depicts a view of a rear-deploying mechanical broadhead in an open position according to an embodiment of the present disclosure.

FIGS. 5 and 6 depict perspective views of rear-deploying mechanical broadhead 50 in a closed position from a view behind and in front of the drive pin/key respectively according to an embodiment of the present disclosure. Blades 501 as well as the back of tip 502 are depicted in an east-to-west direction on broadhead 50 while drive pin/key 503 is depicted in a north-to-south direction in FIGS. 5 and 6.

FIGS. 7-11 depict views of rear-deploying mechanical broadhead 70 in an open position according to embodiments of the present disclosure. Broadhead 70 depicts blades 703a, 703b on diametrically opposite sides of body 701 and extending outwardly from body 701. Blades 703a, 703b may move to an open position as depicted in FIGS. 7-11 when drive pin/key 702 moves from a first position close to tip 704 to a second position away from tip 704 within a slot or chamber in body 701. Body 701 may have a first end and a second end having an opening/slot at the second end for receiving tip/body pin 706 that may couple body 701 to tip 704. Blades 703a, 703b may be coupled to tip 704 and attached with blade pins 705a, 705b secured in slots on opposite sides of body 701. Blades 703a, 703b may receive blade pins 705a, 705b at the forward portions of blades 703a, 703b nearer to tip 704 and the second end of body 701.

Figure 12A:
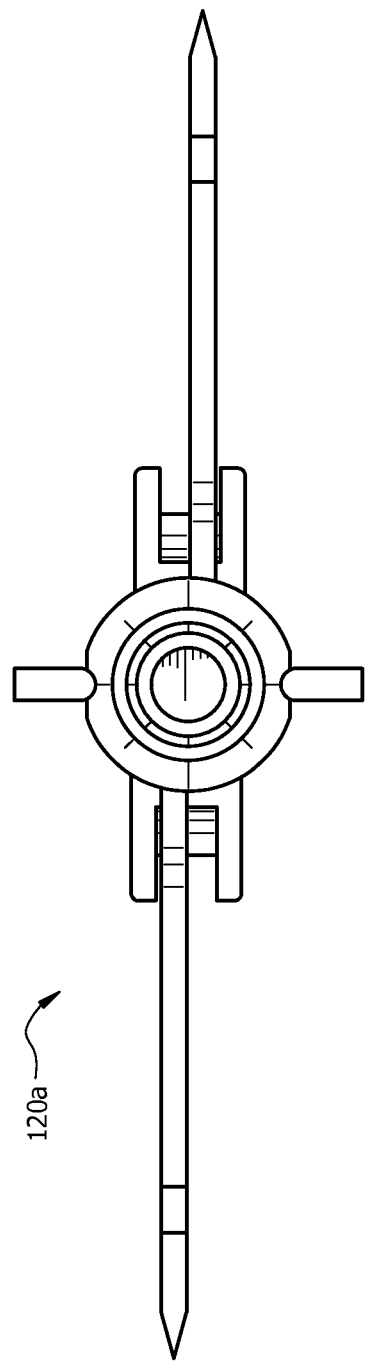
FIG. 12a depicts a perspective view of a rear-deploying mechanical broadhead in an open position from a view behind the drive pin/key according to an embodiment of the present disclosure.
Figure 12B:
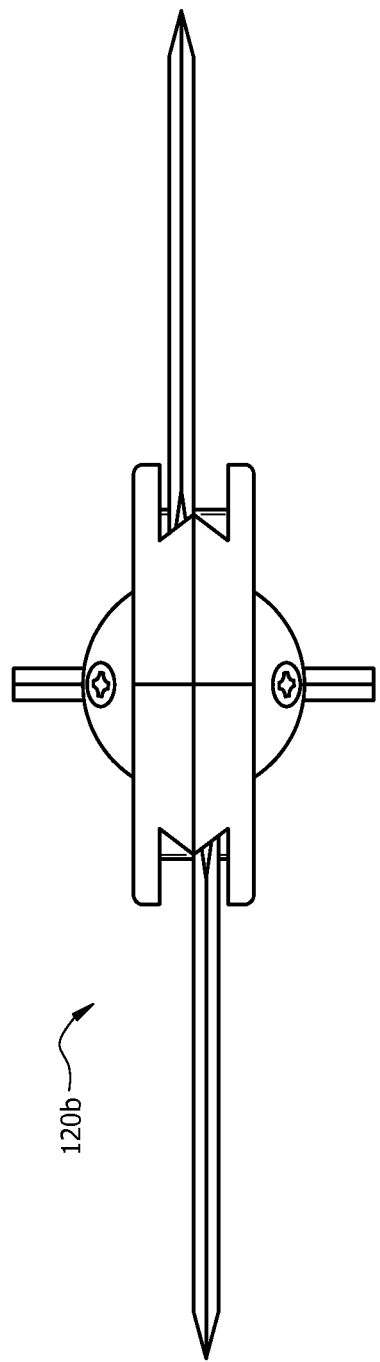
FIG. 12b depicts a perspective view of a rear-deploying mechanical broadhead in an open position from a view in front of the drive pin/key according to an embodiment of the present disclosure.

FIGS. 12a and 12b depict perspective views of a rear-deploying mechanical broadhead in an open position from a view behind and in front of the drive pin/key respectively according to embodiments of the present disclosure. Blades of broadhead 120a, 120b are depicted in an east-to-west direction on broadhead 120a, 120b.

Figure 13:
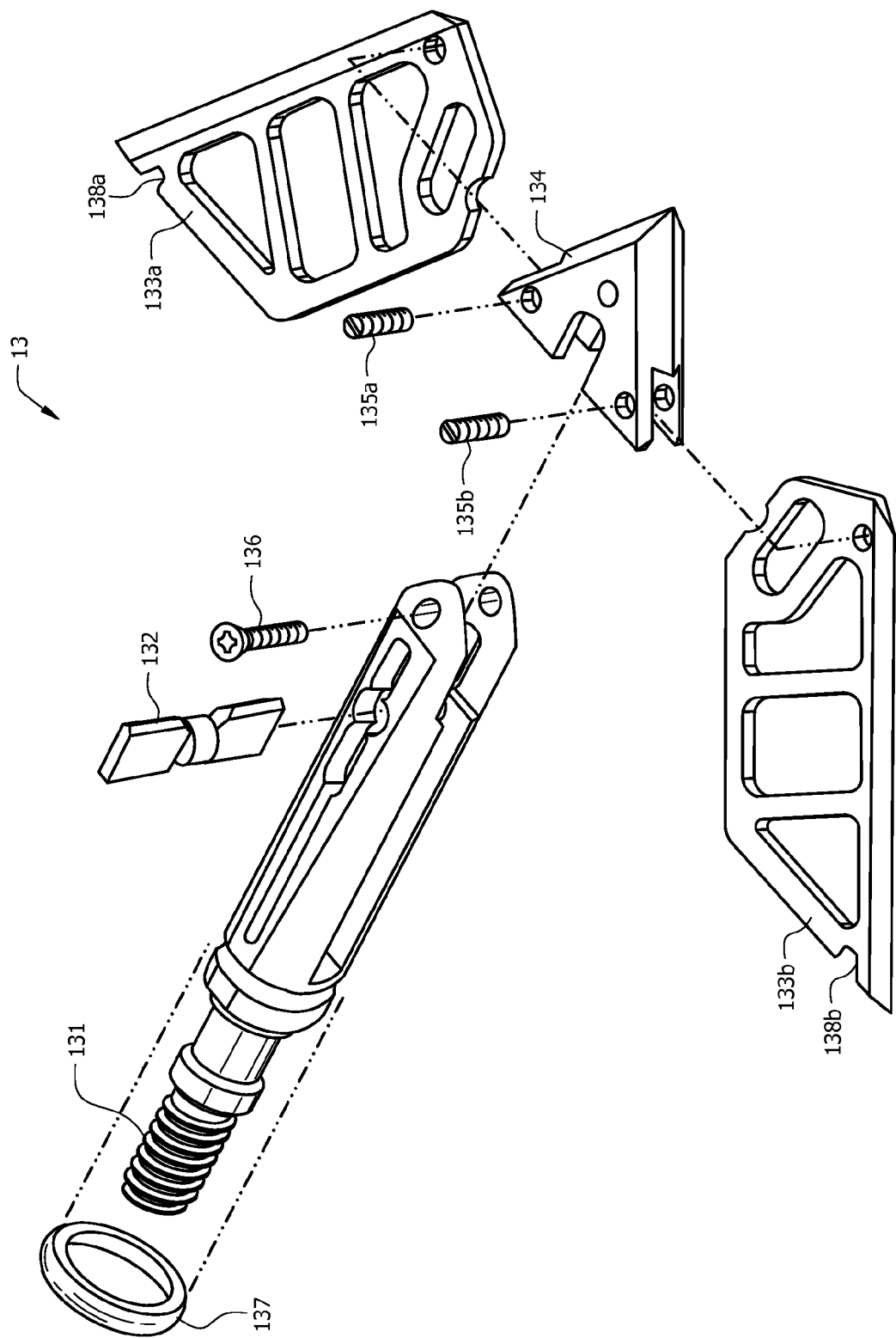
FIG. 13 depicts components of a rear-deploying mechanical broadhead according to an embodiment of the present disclosure.

FIG. 13 depicts components of rear-deploying mechanical broadhead 13 according to an embodiment of the present disclosure. This view may depict how drive pin/key 132 may be inserted into body 131 through a slot or chamber within body 131. As previously described, drive pin/key 132 may be in a first position with the slot or chamber of body 131 closer to tip 134 when blades 133a, 133b are in a closed position and away from tip 134 in a second position when blades 133a, 133b are in an open position. FIG. 13 also depicts how tip/body pin 136 may be inserted into an opening at the pointed end of tip 134 to couple tip 134 to body 131. Similarly, FIG. 13 depicts how blade pins 135a, 135b may be inserted through tip 134 to secure blades 133a, 133b to tip 134 according to an embodiment of the present disclosure. The dotted lines on FIG. 13 depict how each of blade pins 135a, 135b and tip/body pin 136 fit into broadhead 13 to secure body 131, tip 134 and blades 133a, 133b to each other according to embodiments of the present disclosure. In some embodiments of the present disclosure, o-ring 137 may be secured within notches 138a, 138b in blades 133a, 133b.

While the drive pin/key has been described or depicted as generally taking the form of a pin or rod, it should be appreciated that the drive pin/key may be any object that is not formed as part of the body of the broadhead that may be used to push the blades without departing from the present disclosure. Further, while the blade pins and tip/body pins may be referred to as pins, it should be appreciated that they may take the form of a screw or other locking mechanism according to embodiments of the present disclosure.

Broadheads formed according to embodiments of the present disclosure may provide secure blades that do not open until impact with a large tip that is secured to the body. These broadheads may provide for one of the smallest in-flight diameters (approximately less than 5/8 inches) with one of the largest cutting diameters (approximately 1 3/4 inches). The structure of broadheads formed according to embodiments of the present disclosure may provide for a stronger blade design wherein the drive key may act as a bleeder blade when it rests in its final position.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A rear-deploying broadhead drive key comprising:
   a rounded mid-section; and
   a flat portion disposed on each side of the rounded mid-section, the flat portion having bleeder blades with sharpened edges,
   wherein the drive key inserts into a drive key hole within a body of the rear-deploying broadhead, the body being coupled to a tip, and the drive key inserts through a drive key slot within stationary blades of the rear-deploying broadhead to hold the stationary blades in place, and upon contact with an object, the drive key moves from a closed position within the drive key slot closest to the tip to an open position within the drive key slot away from the tip, and
   wherein the drive key is not physically attached to the body or the stationary blades.

2. The rear-deploying broadhead drive key of claim 1 wherein the sharpened edges come into contact with the object.

3. The rear-deploying broadhead drive key of claim 2 wherein when the drive key moves to the open position, the rounded mid-section reaches the end of the drive key slot and the sharpened edges stop moving away from the tip and become stationary, the sharpened edges acting as bleeder blades with respect to the object.

4. A rear-deploying mechanical broadhead comprising:
   a tip coupled to a body;
   stationary blades pinned to the tip;
   a slot disposed within the body, the slot having a first position and a second position, wherein the first position is located closer in proximity to the tip than the second position; and
   a drive key disposed within the slot and not connected to the stationary blades or the tip, wherein the drive key pushes the stationary blades open when the drive key moves to the second position.

5. The rear-deploying mechanical broadhead of claim 4 wherein the stationary blades slide out from inside the body when open and fold back inside the body when unlocked.

6. The rear-deploying mechanical broadhead of claim 4 wherein the tip is coupled to the body by a tip screw.

7. The rear-deploying mechanical broadhead of claim 4 further comprising:
   at least one notch on each of the stationary blades that snaps into a portion of an o-ring.

8. The rear-deploying mechanical broadhead of claim 4 wherein the tip is a cut-on-contact tip that does not move when the rear-deploying mechanical broadhead comes into contact with an object.

9. The broadhead of claim 4 wherein the stationary blades are pinned to the tip with blade pins.

10. The broadhead of claim 4, the stationary blades include cutting edges wherein the cutting width of the stationary blades is smaller near the tip and gradually increases toward the rear along a leading edge of each of the stationary blades.

11. A rear-deploying mechanical broadhead comprising:
    blades disposed diametrically opposite each other along a longitudinal axis of a body; and
    a drive key slot disposed within the body, the drive key slot having a first position and a second position, the first position disposed closer in proximity to a tip than the second position, the slot slidably receiving a free-floating drive key, the drive key having a flat portion that slides up and down within the slot and a round portion that inserts into a drive key slot within the blades,
    wherein the blades are closed when the drive key is disposed in the first position and the blades open and lock in place when the drive key is moved into the second position.

12. The broadhead of claim 11 further comprising:
    an opening within the body that receives a screw that couples the body to the tip.

13. The broadhead of claim 11 further comprising:
    blade pins that couple the blades to the tip.

14. The broadhead of claim 11 further comprising:
   at least one notch on each of the blades that receives at least a portion of an o-ring.

15. The broadhead of claim 11 wherein the tip remains stationary even when the drive key is moved into the second position and the blades open.

16. The broadhead of claim 11 wherein the blades are stationary until the drive key begins to move from the first position into the second position.

17. The broadhead of claim 11, the stationary blades including cutting edges wherein the cutting width of the stationary blades is smaller near the tip and gradually increases toward the rear along a leading edge of the stationary blades.

18. The broadhead of claim 11, the stationary blades including cutting edges wherein the cutting edges of the stationary blades rest directly behind the tip when the drive key is in the first position.

19. The broadhead of claim 11 wherein the drive key acts as bleeder blades.

* * * * *